(12) United States Patent
Kakuta

(10) Patent No.: US 8,184,177 B2
(45) Date of Patent: May 22, 2012

(54) WHITE BALANCE CONTROL APPARATUS, CONTROL METHOD THEREFOR, AND IMAGE SENSING APPARATUS

(75) Inventor: Yuko Kakuta, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 12/392,198

(22) Filed: Feb. 25, 2009

(65) Prior Publication Data

US 2009/0225226 A1 Sep. 10, 2009

(30) Foreign Application Priority Data

Mar. 4, 2008 (JP) ................................. 2008-054070

(51) Int. Cl.
H04N 9/73 (2006.01)
G06K 9/00 (2006.01)
(52) U.S. Cl. .................. 348/223.1; 348/224.1; 382/118; 382/162
(58) Field of Classification Search ............... 348/223.1, 348/224.1, 225.1, 229.1; 382/164
See application file for complete search history.

(56) References Cited

U.S. PATENT DOCUMENTS

| | | | | |
|---|---|---|---|---|
| 7,796,831 B2 * | 9/2010 | Tanaka | ........................ | 382/274 |
| 2006/0284991 A1 * | 12/2006 | Ikeda | ........................ | 348/223.1 |
| 2007/0110321 A1 * | 5/2007 | Okada et al. | ................... | 382/209 |
| 2007/0291155 A1 * | 12/2007 | Kawaguchi et al. | ..... | 348/333.12 |
| 2008/0211925 A1 * | 9/2008 | Misawa et al. | ............. | 348/223.1 |
| 2009/0002519 A1 * | 1/2009 | Nakamura | ................... | 348/223.1 |
| 2009/0067683 A1 * | 3/2009 | Takayama | ...................... | 382/118 |
| 2009/0167892 A1 * | 7/2009 | Takayama | ................... | 348/223.1 |

FOREIGN PATENT DOCUMENTS

| | | |
|---|---|---|
| JP | 2002-251380 | 9/2002 |
| JP | 2003-189325 | 7/2003 |

* cited by examiner

*Primary Examiner* — Kelly L Jerabek

(74) *Attorney, Agent, or Firm* — Cowan, Liebowitz & Latman, P.C.

(57) ABSTRACT

First white balance correction coefficients computed based on a detected face region, and second white balance correction coefficients for correcting, to a skin color, chromaticity obtained after applying the first white balance correction coefficients to the face region are obtained. The degree of detection reliability of the face region is determined based on the parameter values obtained from the pixels of the face region and predetermined conditions. Resultant white balance correction coefficients are computed from the first white balance correction coefficients and the second white balance correction coefficients to which a smaller weight is applied as the degree of detection reliability is lower. Even when a face region is erroneously detected, high-precision white balance correction coefficients can be obtained.

8 Claims, 10 Drawing Sheets

F I G. 3
| R | G1 | R | G1 | R | G1 |
|---|----|---|----|---|----|
| G2 | B | G2 | B | G2 | B |
| R | G1 | R | G1 | R | G1 |
| G2 | B | G2 | B | G2 | B |
| R | G1 | R | G1 | R | G1 |
| G2 | B | G2 | B | G2 | B |
ONE BLOCK
F I G. 4
| 1/16 | 2/16 | 1/16 |
|------|------|------|
| 2/16 | 4/16 | 2/16 |
| 1/16 | 2/16 | 1/16 |
F I G. 5
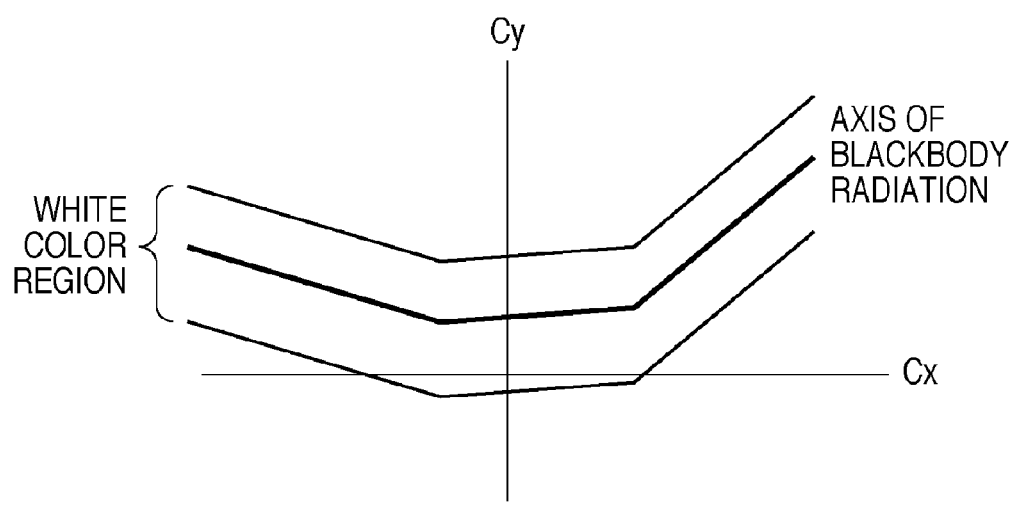

FIG. 9

| ITEM | CONDITIONS |
|---|---|
| LUMINANCE VALUE ($L^*$) | $0<L^*<25$ OR $75<L^*<100$ |
| HUE (Hue) | $0 \leq H \leq 9$ OR $28 \leq H \leq 360$ |
| CHROMATICITY ($C^*$) | $0 \leq C^* \leq 10$ OR $25 \leq C^*$ |
| CONTRAST $Y_{gry}$ | $0 \leq Y_{gry} \leq 70$ OR $200 \leq Y_{gry} \leq 255$ |
| HISTOGRAM | ONE OF FOLLOWING CONDITIONS (%): <br><br> $Ratio(Y_{0-50}) \geq 60$ <br> $0 \leq Ratio(Y_{50-100}) \leq 30$ <br> $0 \leq Ratio(Y_{100-150}) \leq 40$ <br> $0 \leq Ratio(Y_{150-200}) \leq 20$ <br> $Ratio(Y_{150-200}) \geq 60$ <br> $Ratio(Y_{200-255}) \geq 60$ |

FIG. 12

| ITEM | | CONDITION SET 1 | CONDITION SET 2 | CONDITION SET 3 |
|---|---|---|---|---|
| LUMINANCE VALUE ($L^*$) | | $0<L^*<25, 75<L^*<100$ | $0<L^*<15, 55<L^*<100$ | $0<L^*<45, 75<L^*<100$ |
| HUE (Hue) | | $0 \leq H \leq 9, 28 \leq H \leq 360$ | $0 \leq H \leq 7, 35 \leq H \leq 360$ | $0 \leq H \leq 4, 35 \leq H \leq 360$ |
| CHROMATICITY ($C^*$) | | $0 \leq C^* \leq 10, 25 \leq C^*$ | $0 \leq C^* \leq 19, 37 \leq C^*$ | $0 \leq C^* \leq 5, 25 \leq C^*$ |
| CONTRAST $Y_{gry}$ | | $0 \leq Y_{gry} \leq 70, 200 \leq Y_{gry} \leq 255$ | $0 \leq Y_{gry} \leq 100, 200 \leq Y_{gry} \leq 255$ | $0 \leq Y_{gry} \leq 50, 220 \leq Y_{gry} \leq 255$ |
| HISTOGRAM | | Ratio($Y_{0-50}$)≥60 or 0≤Ratio($Y_{50-100}$)≤30 or 0≤Ratio($Y_{100-150}$)≤40 or 0≤Ratio($Y_{150-200}$)≤20 or Ratio($Y_{150-200}$)≥60 or Ratio($Y_{200-255}$)≥60 | Ratio($Y_{0-50}$)≥30 or 0≤Ratio($Y_{50-100}$)≤50 or 0≤Ratio($Y_{100-150}$)≤40 or 0≤Ratio($Y_{150-200}$)≤20 or Ratio($Y_{150-200}$)≥80 or Ratio($Y_{200-255}$)≥60 | Ratio($Y_{0-50}$)≥80 or 0≤Ratio($Y_{50-100}$)≤20 or 0≤Ratio($Y_{100-150}$)≤10 or 0≤Ratio($Y_{150-200}$)≤80 or Ratio($Y_{150-200}$)≥80 or Ratio($Y_{200-255}$)≥80 |

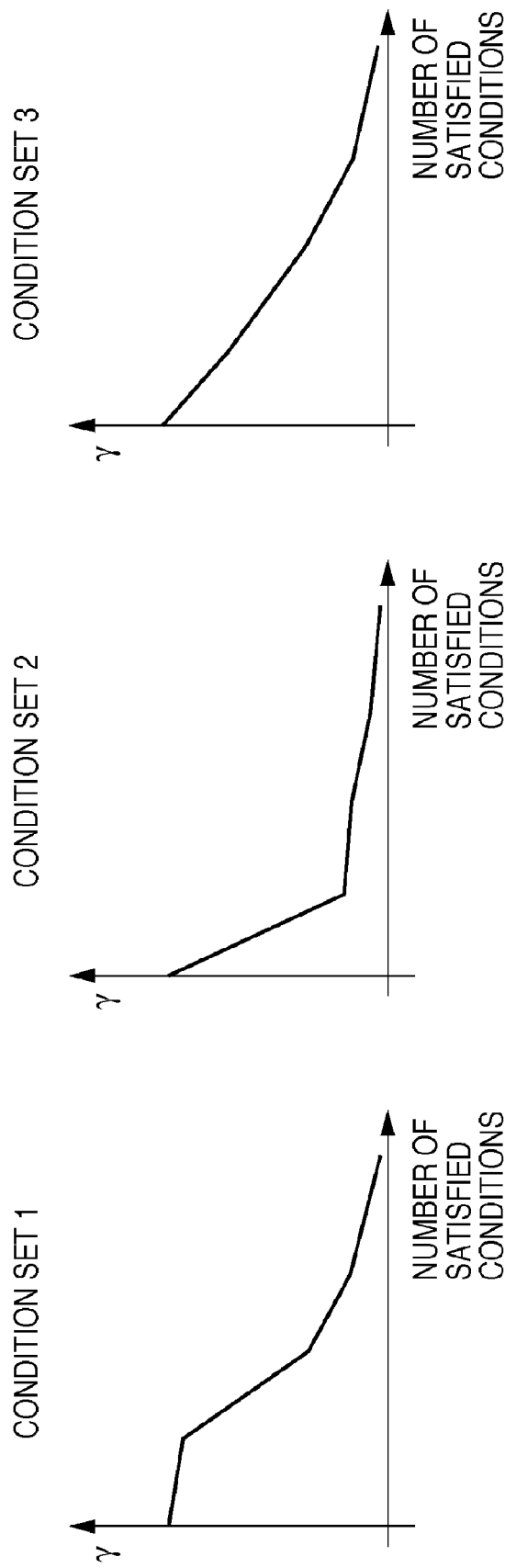

WHITE BALANCE CONTROL APPARATUS, CONTROL METHOD THEREFOR, AND IMAGE SENSING APPARATUS

BACKGROUND OF THE INVENTION

1. Field of the Invention

The present invention relates to a white balance control apparatus and control method therefor and, more particularly, to a white balance control apparatus which controls the white balance of an image on the basis of the luminance and color difference signals of the image, and a control method therefor.

The present invention also relates to an image sensing apparatus using the white balance control apparatus according to the present invention.

2. Description of the Related Art

Image sensing apparatuses using image sensors, such as a digital camera and digital video camera, have a white balance control function of adjusting the color tone of a sensed image. The white balance control corrects a pixel value using a white balance correction value so as to sense a white subject as a white.

The white balance control includes manual white balance control to obtain a white balance correction value by sensing a subject the user wants to sense as a white, and auto white balance control to obtain a white balance correction value by automatically detecting, from a sensed image, a portion regarded to be white.

To perform auto white balance control, a white subject is sensed in advance under a variety of light sources to compute the color-evaluation values of sensed images. The color-evaluation values are plotted in a predetermined color-space coordinate system to determine a white color region for each light source.

FIG. 5 is a graph showing an example of a white color region. The negative direction of the x-coordinate ($C_x$) in the $C_x$-$C_y$ coordinate system represents a color-evaluation value obtained upon sensing a white subject under a high-color-temperature light source, and the positive direction represents a color-evaluation value obtained upon sensing a white subject under a low-color-temperature light source. The y-coordinate ($C_y$) represents the degree of the green (G) component of a light source. As the color-evaluation value becomes larger in the negative direction, the green component becomes larger. That is, when the light source is a fluorescent light, color-evaluation values are distributed in the negative direction.

When performing auto white balance control, an image is divided into a plurality of blocks, and a color-evaluation value is obtained for each block. A block having a color-evaluation value falling within a white color region as shown in FIG. 5 is determined to be white. The pixel values of blocks determined to be white among a plurality of blocks which form an image are integrated. White balance correction values which make, for example, the respective color components (R, G, and B) of the integrated values equal to each other are computed.

However, the color-evaluation value of the skin color region obtained by shooting under solar light, and that of a white subject shot under tungsten light are distributed in almost the same region. According to a conventional auto white balance control method, a skin color shot under solar light may be erroneously determined as a white under tungsten light and be whitely corrected.

Recently, image sensing apparatuses which use a face detection technique to perform auto exposure control of properly exposing a human face or perform auto focus detection control of focusing on a human face have been commercially available. In this situation, it is proposed to employ the face detection technique in white balance control as well. Japanese Patent Laid-Open No. 2003-189325 intends to solve the problem of erroneously detecting a skin color as a white by performing white balance control while excluding a face region detected by a face detection circuit from white pixel detection targets.

However, the white balance control method disclosed in Japanese Patent Laid-Open No. 2003-189325 does not consider a measure against a case wherein a face region is erroneously detected. When a region which is not a human face is erroneously detected as a face region, the white color region becomes excessively small, degrading the precision of obtained color temperature information and that of white balance control.

SUMMARY OF THE INVENTION

The present invention has been made to overcome the conventional drawbacks, and provides a white balance control apparatus capable of obtaining high-precision white balance correction coefficients even when a face region is erroneously detected, and a control method therefor.

According to an aspect of the present invention, there is provided a white balance control apparatus which computes white balance correction coefficients to be applied to a sensed image, comprising: a face detection unit which detects a face region from the image; a first coefficient computing unit which computes a first white balance correction coefficient for the entire image; a second coefficient computing unit which divide the image into a plurality of blocks, and computes a second white balance correction coefficient for correcting chromaticity, which is obtained after applying the first white balance correction coefficient to a pixel value of a block falling within the face region among the plurality of blocks, to a skin color; a determination unit which determines a weight of the second white balance correction coefficient in accordance with both a plurality of parameter values obtained from pixels of blocks falling within the face region and a set of conditions defined in advance for at least some of the parameter values; and a computing unit which computes a resultant white balance correction coefficient for the image in accordance with the first white balance correction coefficient and the second white balance correction coefficient weighted by the determined weight, wherein the determination unit determines the weight, in accordance with both the plurality of parameter values and the conditions defined in advance, so as to decrease the weight more as a degree at which the detected face region is not a human face is higher.

According to another aspect of the present invention, there is provided a method of controlling a white balance control apparatus which computes white balance correction coefficients to be applied to a sensed image, comprising: a face detection step of detecting a face region from the image; a first coefficient computing step of computing a first white balance correction coefficient for the entire image; a second coefficient computing step of dividing the image into a plurality of blocks, and computing a second white balance correction coefficient for correcting chromaticity, which is obtained after applying the first white balance correction coefficient to a pixel value of a block falling within the face region among the plurality of blocks, to a skin color; a determination step of determining a weight of the second white balance correction coefficient in accordance with both a plurality of parameter values obtained from pixels of blocks falling within the face region and a set of conditions defined in advance for at least some of the parameter values; and a computing step of computing a resultant white balance correction coefficient for the image in accordance with the first white balance correction coefficient and the second white balance correction coefficient weighted by the determined weight, wherein in the determination step, the weight is determined in accordance with the plurality of parameter values and the conditions defined in advance, so as to decrease the weight as a degree at which the detected face region is not a human face is higher.

Further features of the present invention will become apparent from the following description of exemplary embodiments with reference to the attached drawings.

BRIEF DESCRIPTION OF THE DRAWINGS

FIG. 3 is a view showing an example of the arrangement of primary color filters of an image sensor 103 in the first embodiment of the present invention;

FIG. 4 is a view showing an example of the coefficients of a two-dimensional filter for generating a luminance signal;

FIG. 5 is a graph showing an example of a white color region;

FIG. 9 is a table showing an example of a set of conditions for determining the degree of reliability of the face region on the basis of parameter values obtained from a detected region in the first embodiment of the present invention;

FIG. 12 is a table showing an example of sets of conditions for determining the degree of reliability of the face region on the basis of parameter values obtained from a detected region in the second embodiment of the present invention; and FIGS. 13A to 13C are graphs showing examples of the relationship between the number of conditions and the addition ratio γ that are prepared in correspondence with respective sets of conditions in the second embodiment of the present invention.

DESCRIPTION OF THE EMBODIMENTS

Preferred embodiments of the present invention will now be described in detail in accordance with the accompanying drawings.

First Embodiment

Figure 1:
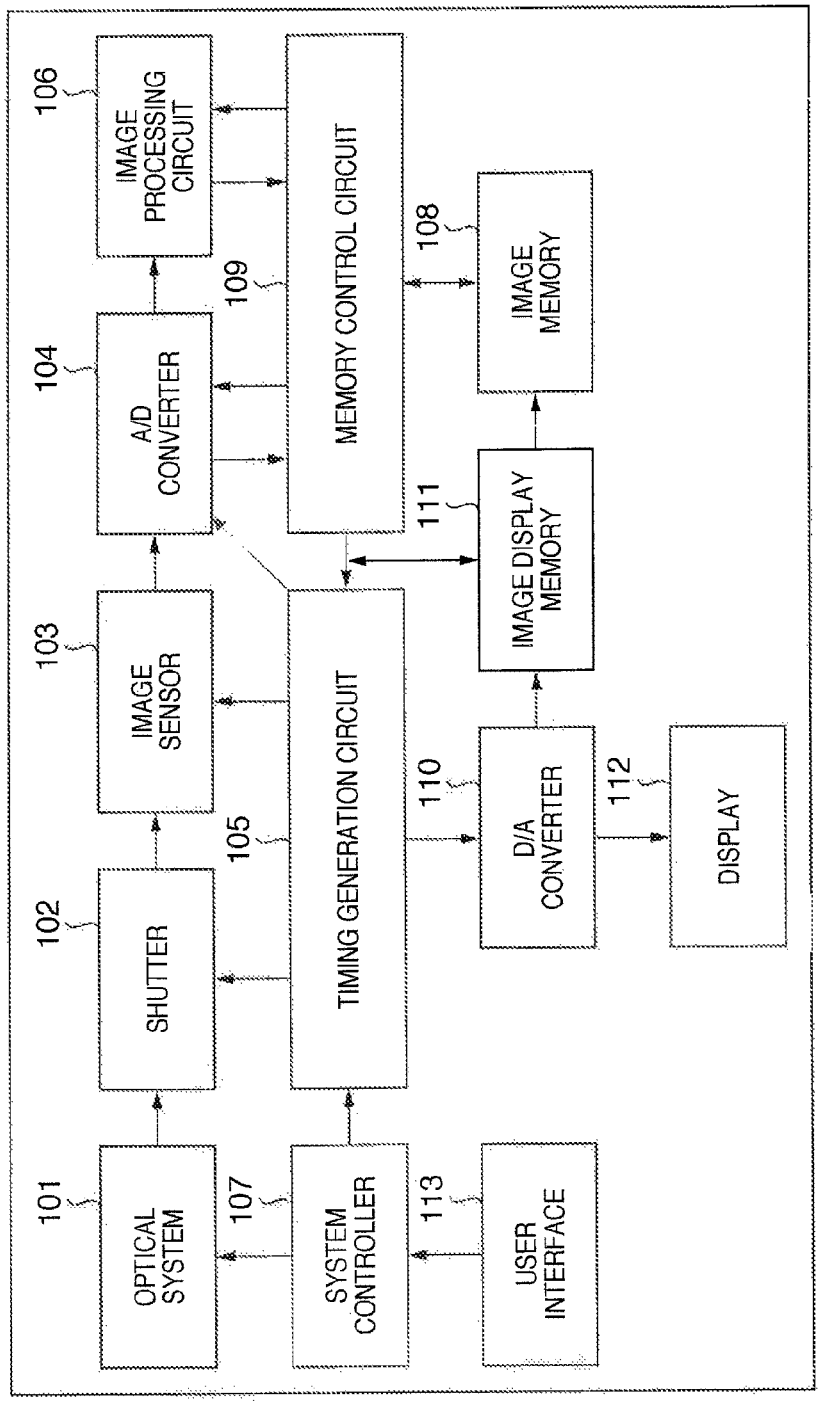
FIG. 1 is a block diagram showing an example of the arrangement of an image sensing apparatus to which a white balance control apparatus according to the first embodiment of the present invention is applicable.

FIG. 1 is a block diagram showing an example of the arrangement of an image sensing apparatus to which a white balance control apparatus according to the first embodiment of the present invention is applicable.

In FIG. 1, an optical system 101 has a zoom lens, focusing lens, and the like, and forms an optical subject image on an image sensor 103 under the control of a system controller 107. A shutter 102 is a mechanical shutter having a stop. The image sensor 103 is a solid-state image sensor such as a CCD image sensor or CMOS image sensor. The image sensor 103 includes, for example, primary color filters having a Bayer array, and can shoot a color image.

An A/D converter 104 converts an analog output from the image sensor 103 into digital data. A timing generation circuit 105 supplies clock signals and control signals to the shutter 102, the image sensor 103, the A/D converter 104, and a D/A converter 110. The timing generation circuit 105 is controlled by a memory control circuit 109 and the system controller 107.

An image processing circuit 106 performs predetermined pixel interpolation processing and color conversion processing for sensed data from the A/D converter 104 or memory control circuit 109. The image processing circuit 106 applies, to sensed data, predetermined computing processing necessary for the system controller 107 to perform AF (Auto Focus) processing, AE (Auto Exposure) processing, EF (pre-Electronic Flash) processing, and AWB (Auto White Balance) processing.

Further, the image processing circuit 106 performs face detection processing for an image. The face detection processing can adopt a well-known face detection technique such as a method based on learning using a neural network, or a method of searching an image for feature portions such as an eye, nose, and mouth by using pattern matching, and if the similarity is high, regarding the portions as a face. Many other methods are proposed as well including a method of detecting image feature amounts such as a skin color and eye shape, and statistically analyzing them. In general, these methods are combined to increase the face detection precision. A specific example is a method of detecting a face using a combination of wavelet transformation and an image feature amount, which is described in Japanese Patent Laid-Open No. 2002-251380.

If necessary, sensed data output from the A/D converter 104 is written in an image memory 108 or image display memory 111 via the image processing circuit 106 and memory control circuit 109.

The image memory 108 is used to store sensed still images and moving images. An image sensing apparatus 1 according to the embodiment includes the image memory 108 of a capacity enough to cope with high-speed continuous shooting, panoramic shooting, and movie shooting. The image memory 108 can also be used as the work area of the system controller 107.

Display image data written in the image display memory 111 is displayed on a display 112 via the D/A converter 110. The display 112 is, for example, an LCD or organic EL display, and can turn on/off the display in accordance with an instruction from the system controller 107. When the display is turned off, the power consumption of the image sensing apparatus can be reduced.

A user interface 113 is an input device group which includes buttons, switches, levers, and the like and allows the user to input instructions to the image sensing apparatus 1. An operation to the user interface 113 is input to the system controller 107.

Figure 2:
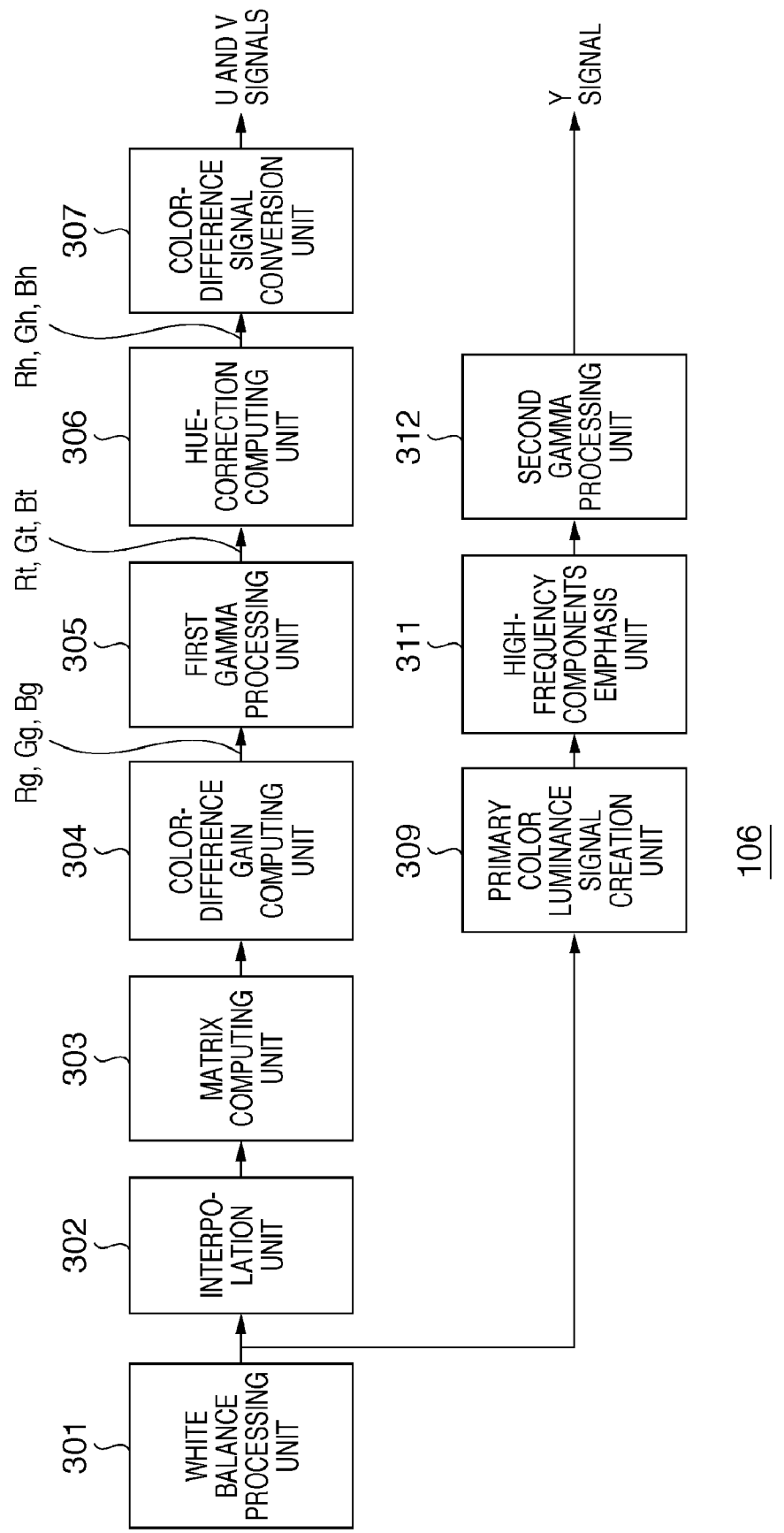
FIG. 2 is a block diagram showing an example of a functional arrangement regarding color processing in an image processing circuit 106 in the first embodiment of the present invention.

FIG. 2 is a block diagram showing an example of a functional arrangement regarding color processing in the image processing circuit 106. FIG. 3 is a view showing an example of the arrangement of the primary color filters of the image sensor 103. The image processing circuit 106 also includes a processing block for executing the above-described face detection processing, but this processing block is not illustrated in FIG. 2.

Pixels which form the image sensor 103 are divided into blocks as shown in FIG. 3. The R, G1, G2, and B signal values of each block are read from the image sensor 103 in accordance with the timing generation circuit 105, converted into digital signals by the A/D converter 104, and then input to the image processing circuit 106.

In the image processing circuit 106, a white balance processing unit 301 obtains white balance correction coefficients and the color temperature of a light source which make it possible to obtain white signals from white pixels.

In the following description, $C_x$ and $C_y$ represent color-evaluation values for determining the color temperature of a light source, and kWB_R, kWB_G1, kWB_G2, and kWB_B represent the white balance correction coefficients of the color signals R, G1, G2, and B.

$C_x$ and $C_y$ are computed for each block. Equations to compute $C_x$ and $C_y$ values are $$C_x = \frac{4*(R-B)}{Y_i} \quad (1)$$

$$C_y = \frac{4*\{(R+B)-(G1+G2)\}}{Y_i}$$

for $$Y_i = \frac{R+G1+G2+B}{4}$$

A method of computing the white balance correction coefficients kWB_R, kWB_G1, kWB_G2, and kWB_B is as follows. As shown in FIG. 5, a white color is shot at high to low color temperatures, and respective color-evaluation values $C_x$ and $C_y$ are plotted to set a white axis. Since the white color of an actual light source slightly varies, a region representing white has a margin. This region is called a white color region. At this time, $C_x$ and $C_y$ of each block of the image sensor shown in FIG. 3 are plotted. If $C_x$ and $C_y$ of each block fall within the white color region, the block is determined to be white. Then, integral values Sum_R, Sum_G1, Sum_G2, and Sum_B of color pixels falling within the white color region are computed to compute the white balance correction coefficients kWB_R, kWB_G1, kWB_G2, and kWB_B:

$$kWB\_R = 1/Sum\_R$$

$$kWB\_G1 = 1/Sum\_G1$$

$$kWB\_G2 = 1/Sum\_G2$$

$$kWB\_B = 1/Sum\_B \quad (2)$$

In accordance with the computing results, the white balance processing unit 301 serving as a first coefficient computing means applies the white balance correction coefficients to digital signals output from the A/D converter 104 to process white in the image as white signals. These coefficients are the first WB correction coefficients.

Digital data having undergone white balance processing are supplied to a primary color luminance signal creation unit 309 and interpolation unit 302. The interpolation unit 302 creates R, G, G1, G2, and B plane data by interpolation using pixels at R, G1, G2, and B (A, B, C, and D) positions from the pixel array of a single-plane type image sensor.

A matrix computing unit 303 performs color conversion for respective pixels:

$$\begin{pmatrix} Rm \\ Gm \\ Bm \end{pmatrix} = \begin{pmatrix} M11 & M21 & M31 & M41 \\ M12 & M22 & M32 & M42 \\ M13 & M23 & M33 & M43 \end{pmatrix} \begin{pmatrix} A \\ B \\ C \\ D \end{pmatrix} \quad (3)$$

A color-difference gain computing unit 304 applies gains to color-difference signals or digital signals having undergone matrix computing processing.

The Rm, Gm, and Bm signals are converted into Y, Cr, and Cb signals:

$$\begin{pmatrix} Y \\ Cr \\ Cb \end{pmatrix} = \begin{pmatrix} 0.3 & 0.59 & 0.11 \\ 0.7 & -0.59 & -0.11 \\ -0.3 & -0.59 & 0.89 \end{pmatrix} \begin{pmatrix} Rm \\ Gm \\ Bm \end{pmatrix} \quad (4)$$

Gains are applied to the Cr and Cb signals:

$$Cr' = G1 \times Cr$$

$$Cb' = G1 \times Cb \quad (5)$$

The Y, Cr', and Cb' signals are converted into Rg, Gg, and Bg signals by determinant (6) (inverse of matrix (4)):

$$\begin{pmatrix} Rg \\ Gg \\ Bg \end{pmatrix} = \begin{pmatrix} 0.3 & 0.59 & 0.11 \\ 0.7 & -0.59 & -0.11 \\ -0.3 & -0.59 & 0.89 \end{pmatrix}^{-1} \begin{pmatrix} Y \\ Cr' \\ Cb' \end{pmatrix} \quad (6)$$

The digital signals Rg, Gg, and Bg having undergone color-difference gain computing processing are sent to a first gamma processing unit 305. The first gamma processing unit 305 converts the digital signals:

$$Rt = \text{GammaTable}[Rg] \quad (7)$$

$$Gt = \text{GammaTable}[Gg] \quad (8)$$

$$Bt = \text{GammaTable}[Bg] \quad (9)$$

where GammaTable [ ] means looking up of a predetermined one-dimensional lookup table.

The digital signals Rt, Gt, and Bt having undergone gamma processing are sent to a hue-correction computing unit 306.

The Rt, Gt, and Bt signals are converted into Y, Cr, and Cb signals:

$$\begin{pmatrix} Y \\ Cr \\ Cb \end{pmatrix} = \begin{pmatrix} 0.3 & 0.59 & 0.11 \\ 0.7 & -0.59 & -0.11 \\ -0.3 & -0.59 & 0.89 \end{pmatrix} \begin{pmatrix} Rt \\ Gt \\ Bt \end{pmatrix} \quad (10)$$

The Cr and Cb signals are corrected into Cr' and Cb' signals:

$$\begin{pmatrix} Cr' \\ Cb' \end{pmatrix} = \begin{pmatrix} H11 & H21 \\ H12 & H22 \end{pmatrix} \begin{pmatrix} Cr \\ Cb \end{pmatrix} \quad (11)$$

where H11 to H22 are coefficients.

The Y, Cr', and Cb' signals are converted into Rh, Gh, and Bh signals by determinant (12) (inverse of matrix (10)):

$$\begin{pmatrix} Rh \\ Gh \\ Bh \end{pmatrix} = \begin{pmatrix} 0.3 & 0.59 & 0.11 \\ 0.7 & -0.59 & -0.11 \\ -0.3 & -0.59 & 0.89 \end{pmatrix}^{-1} \begin{pmatrix} Y \\ Cr' \\ Cb' \end{pmatrix} \quad (12)$$

The Rh, Gh, and Bh signals output from the hue-correction computing unit 306 are sent to a color-difference signal conversion unit 307.

The color-difference signal conversion unit 307 generates U and V signals:

$$\begin{pmatrix} U \\ V \end{pmatrix} = \begin{pmatrix} -0.169 & -0.333 & 0.502 \\ 0.499 & -0.421 & -0.078 \end{pmatrix} \begin{pmatrix} Rh \\ Gh \\ Bh \end{pmatrix} \quad (13)$$

The primary color luminance signal creation unit 309 generates primary color luminance signals corresponding to primary color filters from digital signals sent from the white balance processing unit 301.

A primary color luminance signal generation method will be explained.

When the primary color filters shown in FIG. 3 in the embodiment are adopted, all the signals of R and B pixels are set to 0, and the results of two-dimensional filtering processing having coefficients shown in FIG. 4 are generated as luminance signals.

The luminance signals generated by the primary color luminance signal creation unit 309 undergo edge emphasis by a high-frequency components emphasis unit 311 and gamma conversion by a second gamma processing unit 312, thereby generating Y signals.

White balance processing in the image sensing apparatus according to the first embodiment will be explained with reference to a flowchart shown in FIG. 6.

Figure 6:
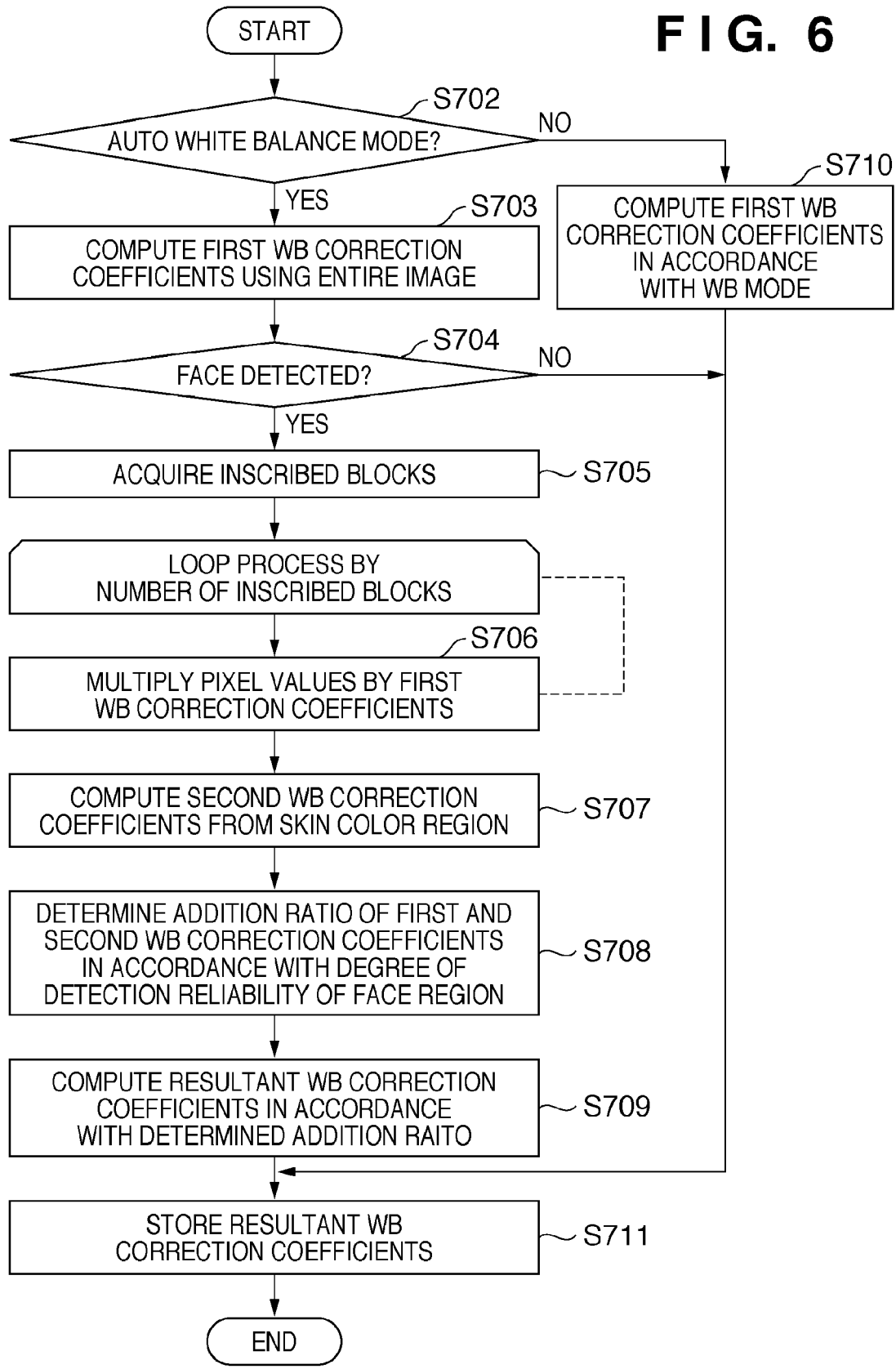
FIG. 6 is a flowchart for explaining the operation of white balance processing in the first embodiment of the present invention.

The processing shown in FIG. 6 starts when the power switch is turned on. The white balance processing unit 301 in the image processing circuit 106 executes this processing.

In S702, the white balance processing unit 301 determines whether the white balance mode setting of the image sensor is the auto white balance mode (AWB mode). In the AWB mode, the WB correction coefficient is automatically determined in accordance with the scene. If the white balance mode setting is not the AWB mode, the white balance processing unit 301 shifts the process to S710 to compute the first WB correction coefficients corresponding to the WB mode. For example, the white balance processing unit 301 detects white blocks in accordance with the $C_x$ and $C_y$ values of respective blocks using the entire image. The white balance processing unit 301 computes, as resultant WB correction coefficients, the WB correction coefficients kWB_R, kWB_G1, kWB_G2, and kWB_B using equations (2) for the white blocks.

If the white balance mode setting is the AWB mode, the white balance processing unit 301 detects white blocks in accordance with the $C_x$ and $C_y$ values of respective blocks using the entire image. The white balance processing unit 301 computes, as the first WB correction coefficients, the WB correction coefficients kWB_R, kWB_G1, kWB_G2, and kWB_B using equations (2) for the white blocks (S703). A face detection unit (not shown) in the image processing circuit 106 determines whether there is a region (face region) assumed to be a face in a display image to be displayed on an electronic viewfinder (EVF) (S704). A display image used when the display 112 functions as the EVF is smaller in the number of pixels than an image sensed by the image sensor 103. Thus, when the display image undergoes face detection, the processing load can be reduced. However, face detection may be applied not to a display image but to a sensed image having a larger number of pixels.

If it is determined that there is a face in the display image, the image processing circuit 106 writes, for example, the image of a frame (face frame) representing a face region in the image display memory 111. The display 112 displays the face frame over the display image to represent that the face has been detected. If it is determined that there is no face in the display image, the first WB correction coefficients computed in S703 are stored as resultant WB correction coefficients (S711).

If it is determined in S704 that there is a face in the display image, the white balance processing unit 301 acquires blocks inscribed in the region (face region) detected as a face (S705). The face region may also be a region itself detected as a face, or a region having a specific shape (e.g., a square) circumscribed around the region detected as a face.

Figure 7:
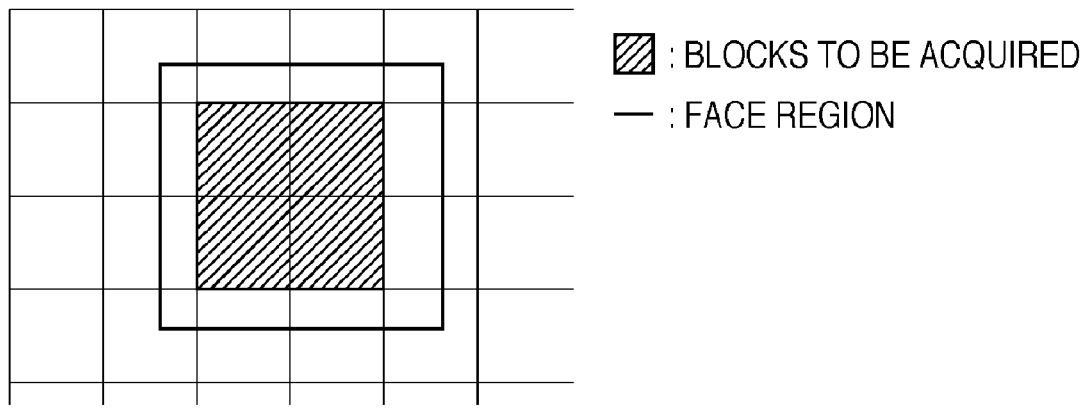
FIG. 7 is a view showing an example of a face region and its inscribed blocks in the first embodiment of the present invention.

FIG. 7 is a view showing an example of the relationship between the face region and inscribed blocks acquired in S705. In the example of FIG. 7, the face region is a square region circumscribed around a region detected as a face, and inscribed blocks are blocks all falling within the face region.

The white balance processing unit 301 outputs the signal values BL_R[i], BL_G1[i], BL_G2[i], and BL_B[i] (i is a block number) of respective pixels for each inscribed block acquired in S705. The white balance processing unit 301 multiplies the signal values of each block by the first WB correction coefficients kWB_R, kWB_G1, kWB_G2, and kWB_B computed in S703, obtaining signal values BL_WR[i], BL_WG1[i], BL_WG2[i], and BL_WB[i] (S706):

BL_WR[i]=BL_R[i]*kWB_R

BL_WG1[i]=BL_G1[i]*kWB_G1

BL_WG2[i]=BL_G2[i]*kWB_G2

BL_WB[i]=BL_B[i]*kWB_B    (14)

where i is a block number.

The white balance processing unit 301 computes $C_x$ and $C_y$ values by integrating the signal values BL_WR[i], BL_WG1[i], BL_WG2[i], and BL_WB[i] computed by equations (14) for all the inscribed blocks. The $C_x$ and $C_y$ values correspond to the $C_x$ and $C_y$ points of all blocks in the face region that are multiplied by the first WB correction coefficients.

Figure 8:
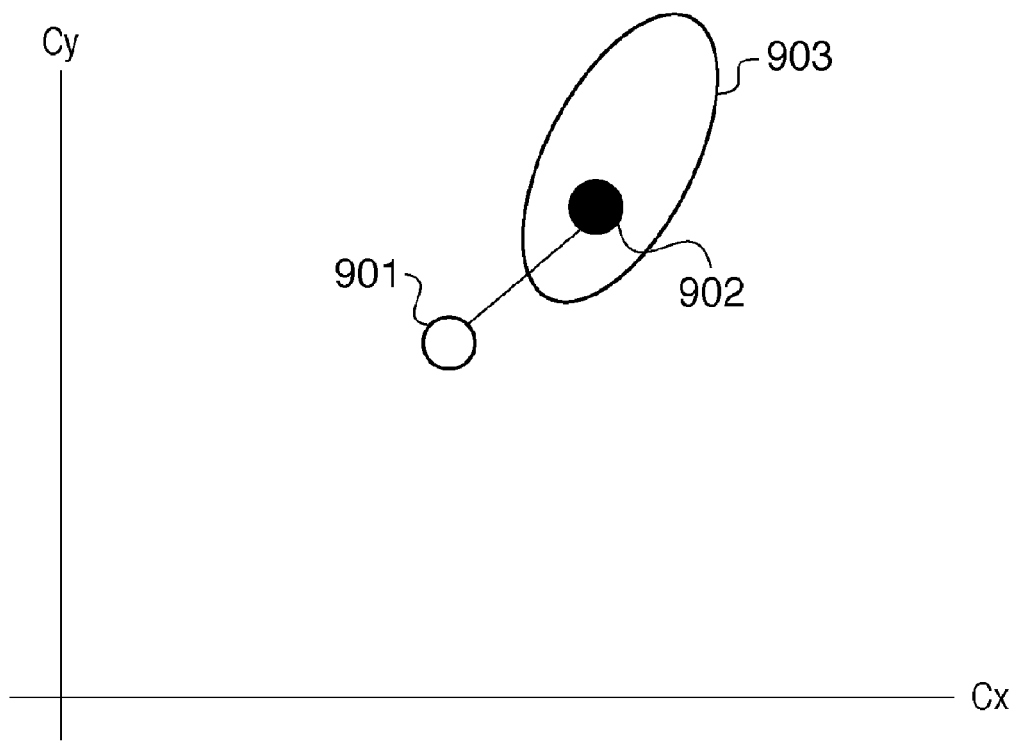
FIG. 8 is a graph showing, on the $C_x$-$C_y$ coordinate plane, an example of the relationship between $C_x$ and $C_y$ values obtained by integrating pixel values in blocks inscribed in the face region, and $C_x$ and $C_y$ values representing a target skin color in the first embodiment of the present invention.

FIG. 8 is a graph showing, on the $C_x$-$C_y$ coordinate plane, an example of the relationship between $C_x$ and $C_y$ values (chromaticity) obtained by integrating pixel values in inscribed blocks, and $C_x$ and $C_y$ values representing a target skin color.

In FIG. 8, a point 901 represents $C_x$ and $C_y$ values computed by multiplying, by first WB correction coefficients, $C_x$ and $C_y$ values obtained in a region (detected region) corresponding to all blocks inscribed in the face region. A point 902 represents $C_x$ and $C_y$ values corresponding to the target chromaticity of the skin color.

In this case, in S707 the white balance processing unit 301 serving as a second coefficient computing means computes, as second WB correction coefficients, WB correction coefficients for converting the value of the point 901 into that of the point 902.

The target value of the skin color may be set to a point where the distance between the skin color region 903 and the point 901 corresponding to the detected region is minimized, or the central point of the skin color region 903. The target value of the skin color may also be set to another position in the skin color region 903.

$WC_x1$ and $WC_y1$ are $C_x$ and $C_y$ values representing correction amounts by the first WB correction coefficients, and $WC_x2$ and $WC_y2$ are $C_x$ and $C_y$ values representing correction amounts by the second WB correction coefficients. The degree of detection reliability of the face region is determined using parameter values obtained in the detected region and a set of conditions defined in advance for at least some of the parameter values. The addition ratio is changed in accordance with the degree of detection reliability (S708). Then, the first and second WB correction coefficients are added, computing resultant WB correction coefficients (S709).

In the first embodiment, to suppress a correction error caused by applying the second WB correction coefficients to a face region whose degree of detection reliability is low, the weight or influence of the second WB correction coefficients to the resultant WB correction coefficients is decreased more as the degree of reliability of the face region lowers.

As long as the weight of the second WB correction coefficients is smaller as the degree of detection reliability lower, a practical correspondence between the degree of reliability and the weight of the second WB correction coefficients can be arbitrarily set.

In S711, the white balance processing unit 301 stores the resultant WB correction coefficients computed in S703, S710, or S709, and uses them in white balance correction processing for a sensed image until white balance correction coefficients are computed the next time.

The frequency at which white balance correction coefficients are computed can be properly determined. For example, it can be determined to compute white balance correction coefficients every three to 10 frames in a display image (e.g., 30 frames/sec).

An example of a concrete method of changing the addition ratio of the first and second WB correction coefficients in accordance with parameter values obtained from a detected region will be explained.

As an example of parameter values obtained from a detected region, the first embodiment adopts luminance, hue, saturation, contrast, and histogram values. For these parameter values, for example, a set of conditions (condition pattern) as shown in FIG. 9 is prepared in advance, and stored in advance in a nonvolatile storage device in the image sensing apparatus that can be accessed by the image processing circuit 106. It is not indispensable to prepare conditions for all parameter values.

Contrast Ygry is the average luminance value (0 to 255) of achromatic pixels in the detected region. Ratio($Y_{0-50}$)≧60% in the histogram means that the ratio of pixels having luminances of 0 to 50 to all pixels in the detected region is 60% or more.

The example shown in FIG. 9 is a set of conditions under which the degree of reliability of a region detected as a face is considered to be low when the parameter values satisfy these conditions. To the contrary, a set of conditions under which the degree of reliability of a region detected as a face is considered to be high when the parameter values satisfy these conditions is also available.

The white balance processing unit 301 determines whether the parameter values obtained from the detected region formed from inscribed blocks acquired in S705 meet some of these conditions. The white balance processing unit 301 determines the addition ratio of the first and second WB correction coefficients in accordance with the number of values which meet the conditions (S708). A larger number of satisfied conditions means a lower degree of reliability of the face region, so the weight of the second WB correction coefficients is decreased.

Figure 10:
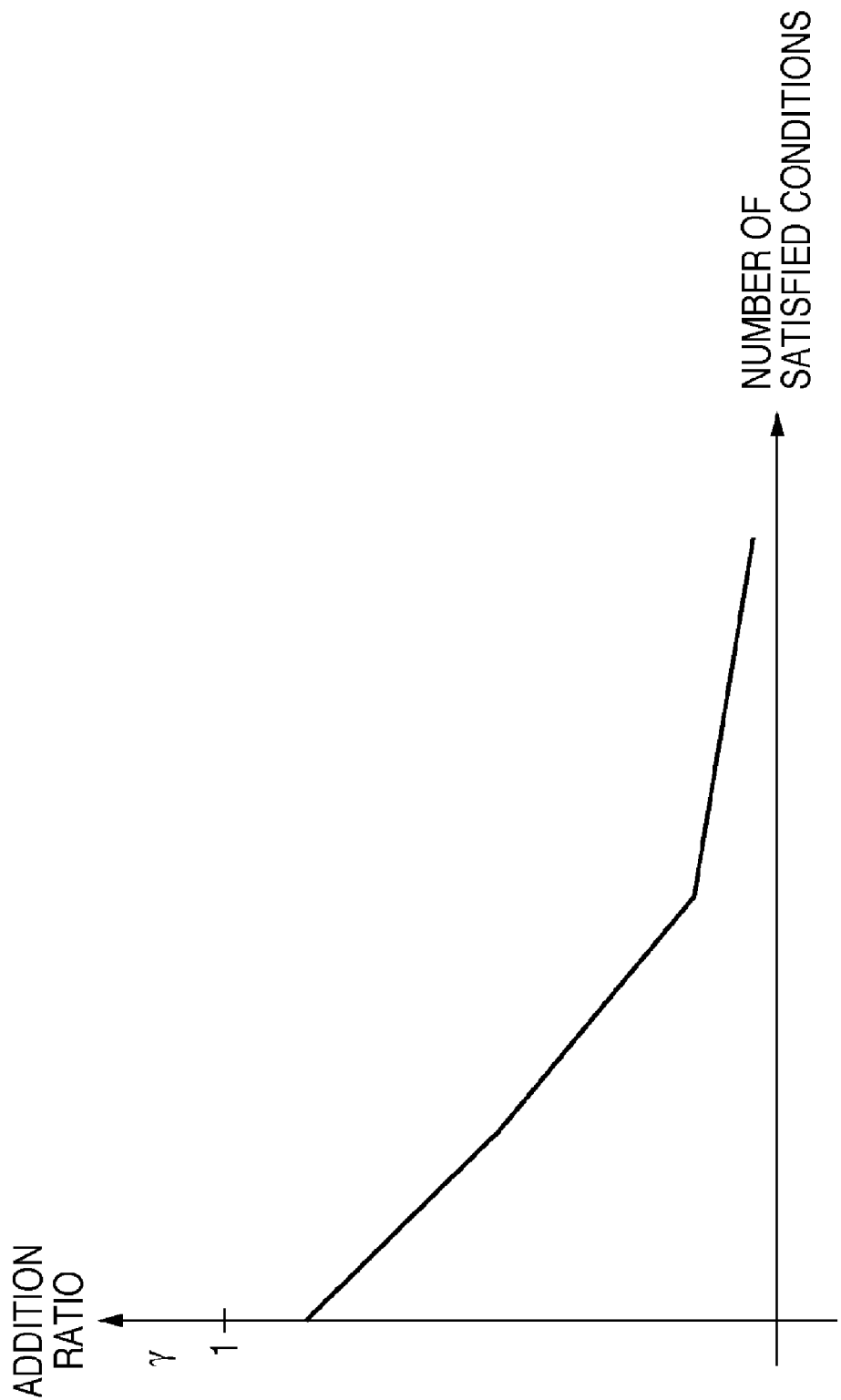
FIG. 10 is a graph showing an example of the relationship between the number of satisfied conditions and the addition ratio γ in the first embodiment of the present invention.

In the first embodiment, the number of satisfied conditions and an addition ratio γ (the weight of the second WB correction coefficients in the embodiment) are determined in accordance with, for example, a predetermined relationship as shown in FIG. 10. The relationship shown in FIG. 10 can be stored in the white balance processing unit 301 in the form of a table which makes the number of satisfied conditions correspond to the addition ratio γ, or the form of a function using the number of satisfied conditions as an argument.

In FIG. 10, the slope of a straight line representing the relationship between the number of satisfied conditions and the addition ratio γ changes midway, but this is merely an example. The slope may also be constant, or the relationship the number of satisfied conditions and the addition ratio γ may also be represented by a curve.

By using the determined addition ratio γ, the white balance processing unit 301 computes resultant WB correction coefficients (S708):

$$C_x(\text{last})=(1-\gamma)WC_x1+\gamma WC_x2$$

$$C_y(\text{last})=(1-\gamma)WC_y1+\gamma WC_y2 \quad (15)$$

An example of changing even the weight of the first WB correction coefficients in accordance with the addition ratio γ has been described. Alternatively, only the second WB correction coefficients may be multiplied by the addition ratio γ.

(Modification 1)

If a plurality of face regions are detected, the detected regions of the respective face regions are multiplied by the first WB correction coefficients in S706. In S707, the average values of $C_x$ and $C_y$ values after applying the first WB correction coefficients to the detected regions of the respective face regions are obtained. In S707, coefficients for correcting the average values to target values of the skin color are obtained as the second WB correction coefficients. In S708, the addition ratio γ is determined in accordance with the number of average values of parameter values obtained from the detected regions of the respective face regions that satisfy conditions in a set of conditions.

When obtaining the average values, weighted average values may also be computed by more heavily weighting as the face region becomes larger.

As described above, according to the first embodiment, when a face region is detected, resultant white balance correction coefficients are obtained from the first white balance correction coefficients and the second white balance correction coefficients for correcting, to a target value of a skin color, a color to which the first white balance correction coefficients are applied. At this time, the influence (weight) of the second white balance correction coefficients on resultant white balance correction coefficients is decreased as the degree of detection reliability of the face region decreases. Then, even if a face region is erroneously detected, a correction error in the erroneously detected face region can be suppressed.

Second Embodiment

The second embodiment of the present invention will be explained.

A white balance control apparatus according to the second embodiment has a plurality of pairs each of a set of conditions used to determine the addition ratio γ, and the relationship between the addition ratio γ and the degree of reliability of the face region (the number of satisfied conditions). The white balance control apparatus determines the addition ratio γ on the basis of the relationship between the addition ratio γ and the degree of reliability of the face region that corresponds to a set of conditions including a largest number of conditions satisfied by parameter values obtained from a detected region.

Figure 11:
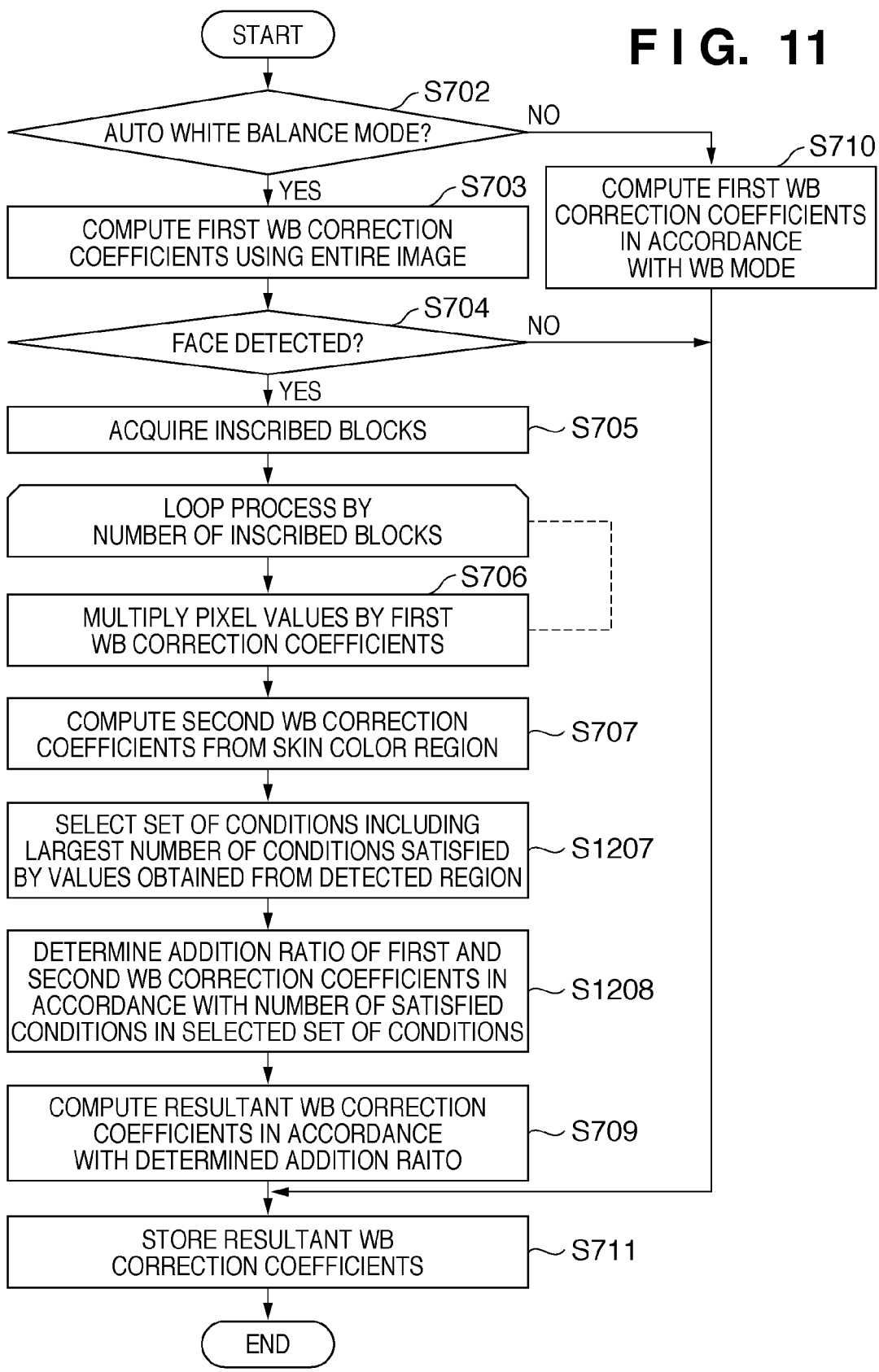
FIG. 11 is a flowchart for explaining the operation of white balance processing in the second embodiment of the present invention.

White balance processing when sensing a scene including a face in an image sensing apparatus according to the second embodiment will be explained with reference to a flowchart shown in FIG. 11. In FIG. 11, the same reference numerals as those in the flowchart of FIG. 6 denote the same steps as those described in the first embodiment, and a description thereof will not be repeated.

The processes in S702 to S707 have been described in the first embodiment. In S1207, a white balance processing unit 301 compares parameter values obtained from a detected region with conditions included in sets of conditions (condition sets 1 to 3) as shown in FIG. 12 that are stored in advance in an internal nonvolatile memory or the like. The white balance processing unit 301 selects a set of conditions including a largest number of satisfied conditions. In this example, sets of conditions having different ranges for the same parameter are prepared. However, the types and number of parameters may also change depending on a set of conditions.

The white balance processing unit 301 determines the addition ratio γ on the basis of the relationship between the addition ratio γ and the degree of reliability of the face region (the number of satisfied conditions) that is also internally stored in advance in correspondence with the set of conditions selected in S1207 (S1208).

FIGS. 13A to 13C are graphs showing examples of the relationship between the addition ratio γ and the degree of reliability of the face region that are prepared in advance in correspondence with condition sets 1 to 3. As described in the first embodiment, these relationships can be stored in the form of a table or function. Also in the second embodiment, the relationship between the addition ratio γ and the degree of reliability of the face region is not limited to those shown in FIGS. 13A to 13C, and can be arbitrarily set.

As shown in FIGS. 13A to 13C, the relationship between the degree of reliability of the face region (the number of satisfied conditions) and the addition ratio γ is changed in consideration of conditions included in a set of conditions. Accordingly, a more appropriate addition ratio γ can be determined.

For example, in FIGS. 13B and 13C, conditions included in a set of conditions corresponding to FIG. 13B are highly likely to suffer a lower degree of reliability. In FIG. 13B, therefore, the addition ratio γ greatly decreases even the number of satisfied conditions is small.

In S709 and subsequent steps, the white balance processing unit 301 performs the same processes as those in the first embodiment, computing resultant WB correction coefficients $C_x$(last) and $C_y$(last) using, for example, equations (15).

(Modification 1)

Similar to the modification to the first embodiment, if a plurality of face regions is detected, the detected regions of the respective face regions are multiplied by the first WB correction coefficients in S706. In S707, the average values of $C_x$ and $C_y$ values after applying the first WB correction coefficients to the detected regions of the respective face regions are obtained. Coefficients for correcting the average values to target values of the skin color are obtained as the second WB correction coefficients. In S1208 and S709, the addition ratio γ is determined for the detected region of each face region. A resultant addition ratio γ is computed in accordance with the addition ratio γ determined for each detected region:

$$\gamma = \frac{\sum_i \gamma[i]}{i} \tag{16}$$

where i is the number of regions detected as a face, and γ[i] is the value of the addition ratio γ computed for the ith region detected as a face.

In S709, the addition ratio γ is applied to, for example, equations (15) to obtain the resultant WB correction coefficients $C_x$(last) and $C_y$(last).

As described above, according to the second embodiment, a set of conditions including a largest number of conditions satisfied by parameter values obtained from pixels in a detected face region is selected from sets of conditions. The addition ratio of the first and second WB correction coefficients is determined based on a relationship corresponding to the selected set of conditions. Hence, a more appropriate addition ratio can be determined in accordance with the characteristics of pixels in a face region. A correction error in a region erroneously detected as a face region can be suppressed at higher precision than in the first embodiment.

Other Embodiments

The above-described embodiments can also be implemented by software by the computer (or CPU or MPU) of a system or apparatus.

Hence, a computer program itself supplied to a computer in order to implement the above-described embodiments by the computer also implements the present invention. That is, the present invention includes the computer program itself for implementing the functions of the above-described embodiments.

The computer program for implementing the above-described embodiments can take any form as long as the computer can read the computer program. Examples of the computer program are an object code, a program executed by an interpreter, or script data supplied to an OS. However, the computer program is not limited to them.

The computer program for implementing the above-described embodiments is supplied to a computer by a storage medium or wired/wireless communication. Examples of the storage medium for supplying the program include a magnetic storage medium (e.g., a flexible disk, hard disk, or magnetic tape), an optical/magnetooptical storage medium (e.g., an MO, CD, or DVD), and a nonvolatile semiconductor memory.

As a computer program supply method using wired/wireless communication, a server on a computer network is available. In this case, the server stores a data file (program file) serving as a computer program which implements the present invention. The program file may take an executable form or the form of a source code.

The program file is supplied by downloading it to a client computer which accesses the server. In this case, it is also possible to divide the program file into a plurality of segment files, and distribute these segment files in different servers.

That is, the present invention also includes a server apparatus which provides a client computer with the program file for implementing the above-described embodiments.

A storage medium which stores the computer program for implementing the above-described embodiments after the computer program is encrypted may also be distributed. In this case, decryption key information is supplied to a user who satisfies predetermined conditions, permitting him to install the computer program in his computer. The key information can be supplied by, for example, prompting the user to download it from a homepage via the Internet.

The computer program for implementing the above-described embodiments may also use the function of an OS running on the computer.

The computer program for implementing the above-described embodiments may also be constituted partially by firmware such as an expansion board mounted in the computer, or executed by the CPU of the expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-054070, filed on Mar. 4, 2008, which is hereby incorporated by reference herein in its entirety.

What is claimed is:

1. A white balance control apparatus which computes white balance correction coefficients to be applied to a sensed image, comprising:
a face detection unit which detects a face region from the image;
a first coefficient computing unit which computes a first white balance correction coefficient for the entire image;
a second coefficient computing unit which divide the image obtained after applying the first white balance correction coefficient into a plurality of blocks, computing a color degree by integrating a pixel value of a block falling within the face region among the plurality of blocks, and computing a second white balance correction coefficient by comparing the color degree with a skin color;
a determination unit which determines a weight of the second white balance correction coefficient in accordance with a statistical value of luminance values of achromatic pixels included in the face region and shape information about a histogram of luminance values of color pixels included in the face region; and
a computing unit which computes a resultant white balance correction coefficient for an image in accordance with the first white balance correction coefficient and the second white balance correction coefficient weighted by the determined weight,
wherein said determination unit determines the weight, in accordance with both the statistical value of the luminance values of the achromatic pixels included in the face region and the shape information about the histogram of the luminance values of the color pixels included in the face region, so that the weight is smaller as a degree at which the detected face region is not a human face is higher.

2. An image sensing apparatus comprising:
a white balance control apparatus according to claim 1; and
a correction unit which corrects an image by using a resultant white balance correction coefficient.

3. A computer-readable recording medium on which a program is stored for causing a computer, when the computer executes the program, to function as a white balance control apparatus according to claim 1.

4. A method of controlling a white balance control apparatus which computes white balance correction coefficients to be applied to a sensed image, comprising:
a face detection step of detecting a face region from the image;
a first coefficient computing step of computing a first white balance correction coefficient for the entire image;
a second coefficient computing step of dividing the image obtained after applying the first white balance correction coefficient into a plurality of blocks, computing a color degree by integrating a pixel value of a block falling within the face region among the plurality of blocks, and computing a second white balance correction coefficient by comparing the color degree with a skin color;
a determination step of determining a weight of the second white balance correction coefficient in accordance with a statistical value of luminance values of achromatic pixels included in the face region and shape information about a histogram of luminance values of color pixels included in the face region; and
a computing step of computing a resultant white balance correction coefficient for an image in accordance with the first white balance correction coefficient and the second white balance correction coefficient weighted by the determined weight,
wherein in the determination step, the weight is determined in accordance with the statistical value of the luminance values of the achromatic pixels included in the face region and the shape information about the histogram of the luminance values of the color pixels included in the face region, so that the weight is smaller as a degree at which the detected face region is not a human face is higher.

5. A white balance control apparatus which computes white balance correction coefficients to be applied to a sensed image, comprising:
a face detection unit which detects a face region from the image; a first coefficient computing unit which computes a first white balance correction coefficient for the entire image;
a second coefficient computing unit which computes a second white balance correction coefficient by comparing the color degree of the pixels included in the face region with a skin color;
a determination unit which determines a weight of the second white balance correction coefficient in accordance with a statistical value of luminance values of achromatic pixels included in the face region and shape information about a histogram of luminance values of color pixels included in the face region; and
a computing unit which computes a resultant white balance correction coefficient for the image in accordance with the first white balance correction coefficient and the second white balance correction coefficient weighted by the determined weight,
wherein said determination unit determines the weight, in accordance with both the statistical value of the luminance values of the achromatic pixels included in the face region and the shape information about the histogram of the luminance values of the color pixels included in the face region, so that the weight is smaller as a degree at which the detected face region is not a human face is higher.

6. An image sensing apparatus comprising:
a white balance control apparatus according to claim 5; and
a correction unit which corrects an image by using a resultant white balance correction coefficient.

7. A computer-readable recording medium on which a program is stored for causing a computer, when the computer executes the program, to function as a white balance control apparatus according to claim 5.

8. A method of controlling a white balance control apparatus which computes white balance correction coefficients to be applied to a sensed image, comprising:
- a face detection step of detecting a face region from the image;
- a first coefficient computing step of computing a first white balance correction coefficient for the entire image;
- a second coefficient computing step of computing a second white balance correction coefficient by comparing the color degree of the pixels included in the face region with a skin color;
- a determination step of determining a weight of the second white balance correction coefficient in accordance with a statistical value of luminance values of achromatic pixels included in the face region and shape information about a histogram of luminance values of color pixels included in the face region; and
- a computing step of computing a resultant white balance correction coefficient for an image in accordance with the first white balance correction coefficient and the second white balance correction coefficient weighted by the determined weight, wherein in the determination step, the weight is determined in accordance with the statistical value of the luminance values of the achromatic pixels included in the face region and the shape information about the histogram of the luminance values of the color pixels included in the face region, so that the weight is smaller as a degree at which the detected face region is not a human face is higher.

* * * * *